United States Patent
Oh et al.

(10) Patent No.: US 8,169,556 B2
(45) Date of Patent: May 1, 2012

(54) LIQUID CRYSTAL DISPLAY AND METHOD FOR DRIVING SAME

(75) Inventors: Joon-hak Oh, Seoul (KR); Cheol-woo Park, Gyeonggi-do (KR); Chong-chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 49 days.

(21) Appl. No.: 12/550,096

(22) Filed: Aug. 28, 2009

(65) Prior Publication Data

US 2009/0316101 A1 Dec. 24, 2009

Related U.S. Application Data

(63) Continuation of application No. 11/366,867, filed on Mar. 1, 2006, now Pat. No. 7,593,069.

(30) Foreign Application Priority Data

Mar. 2, 2005 (KR) .............................. 2005-0017228

(51) Int. Cl.
*G02F 1/133* (2006.01)

(52) U.S. Cl. .............................. 349/37; 345/96; 345/100

(58) Field of Classification Search ...................... 349/37
See application file for complete search history.

(56) References Cited

U.S. PATENT DOCUMENTS

| | | | |
|---|---|---|---|
| 5,805,128 A * | 9/1998 | Kim et al. ....................... 345/96 |
| 6,127,998 A | 10/2000 | Ichikawa et al. | |
| 6,552,706 B1 * | 4/2003 | Ikeda et al. ..................... 345/96 |
| 7,593,069 B2 * | 9/2009 | Oh et al. .......................... 349/43 |
| 2003/0146893 A1 * | 8/2003 | Sawabe .......................... 345/89 |
| 2004/0119673 A1 * | 6/2004 | Park ................................. 345/87 |
| 2004/0263453 A1 * | 12/2004 | Yun et al. ........................ 345/87 |

FOREIGN PATENT DOCUMENTS

| | | |
|---|---|---|
| JP | 2004-245888 | 9/2004 |
| KR | 10-0283717 | 7/1998 |

* cited by examiner

*Primary Examiner* — Thanh-Nhan P. Nguyen
(74) *Attorney, Agent, or Firm* — Innovation Counsel LLP

(57) ABSTRACT

Disclosed is an LCD comprising a plurality of data lines extending in a first direction, a plurality of gate lines extending in a second direction defining with the plurality of data lines a plurality of pixel areas arranged in a matrix configuration and supplying a gate signal to at least two rows of the pixel areas simultaneously. Thin film transistors are connected to the plurality of gate lines and the plurality of data lines. Also disclosed is a driving method for an LCD including a thin film transistor substrate including pixel areas arranged in a matrix form with a gate line extending in a first direction and a data line extending in a second direction, along with a backlight providing the TFT substrate with light of three primary colors. In the method, the three primary colors are sequentially provided in one frame period and at least two rows of pixel areas and simultaneously provided with a common gate signal.

9 Claims, 4 Drawing Sheets

LIQUID CRYSTAL DISPLAY AND METHOD FOR DRIVING SAME

CROSS-REFERENCE TO RELATED APPLICATIONS

This application is a continuation of U.S. patent application Ser. No. 11/366,867, filed Mar. 1, 2006, which claims the benefit of Korean Patent Application No. 2005-0017228, filed on Mar. 2, 2005, in the Korean Intellectual Property Office, the disclosure of which is incorporated herein by reference in its entirety.

BACKGROUND OF THE INVENTION

1. Field of the Invention

The present invention relates to a liquid crystal display (LCD) and a driving method of the same, and more particularly, to an LCD having an improved gate signal application and an improved gate signal application method.

2. Description of the Related Art

Recently, there has been a desire for a lightweight and thin display apparatus. Such desire has caused CRTs (cathode ray tube) to be replaced with flat display apparatuses like an LCD.

Typically an LCD display apparatus is comprised of two substrates and a liquid crystal layer having a dielectric anisotropy disposed therebetween. The LCD applies an electric field to the liquid crystal layer and controls the intensity of the electric field, thereby displaying an image, wherein the transmittance of light passing through the substrate is adjusted according to the intensity of the electric field.

Generally, the conventional LCD has a color filter layer composed of three primary colors i.e. red (R), green (G) and blue (B), and controls the transmittance of light passing through the color filter layer, thereby displaying a required color.

Such an LCD needs pixels corresponding to each R, G and B regions. Therefore, the LCD needs three times more pixels than when it displays a black and white image. Accordingly, the liquid crystal panel of the LCD has to be fabricated with precision so that a high resolution image can be displayed.

Further, fabricating the additional color filter layer on the substrate is intricate, and the transmittance of light for the color filter layer needs to be improved.

Due to the above problems, there has been created an LCD using a FSC (field sequential color) method. The FSC method lights independent R, G and B light sources sequentially and periodically, and transmits a color signal corresponding to each pixel with a synchronization with the lighting period, thereby producing a full color image.

In this FSC method, the three light sources are sequentially lighted to form one frame. Therefore, the FSC method needs to have a frequency three times higher than the conventional driving method. With the FSC method, the term frequency means how many times the frames are refreshed in one second. As the display apparatuses become large, the number of gate lines increases, yet a gate on time decreases. The gate on time represents how long gate on voltage is applied to one gate line. Therefore, the gate on time is the reciprocal of the product of the frequency and the number of the gate lines. As the gate on time decreases, a data signal is not sufficiently applied to the pixel. This causes a charging rate within the pixel electrode to be decreased and quality of the display apparatus to be deteriorated.

SUMMARY OF THE INVENTION

Accordingly, it is an aspect of the present invention to provide an LCD improving a charging rate of the pixel electrode by increasing a gate on time and a driving method of the same.

The foregoing and/or other aspects of the present invention are also achieved by providing an LCD comprising a plurality of data lines extending in a first direction, a plurality of gate lines extending in a second direction defining with the plurality of data lines a plurality pixel areas arranged in a matrix configuration and supplying a gate signal to at least two rows of the pixel areas simultaneously, and thin film transistors connected with the plurality of gate lines and the plurality of data lines.

According to the present invention, the number of the data lines disposed between the adjacent pixel areas in a row direction is the same as that of the rows of the pixel area supplied with the same gate signal.

According to the present invention, a plurality of the gate lines apply a common gate signal to the pixel areas in a row direction.

According to the embodiment of the present invention, the number of the rows of the pixel areas supplied with the common gate signal is two.

According to the embodiment of the present invention, the adjacent pixel areas in a column direction are connected to data lines having opposite polarities.

According to the embodiment of the present invention, one of the adjacent rows of the pixel area in the column direction is connected to an odd-numbered data line, and the other is connected to an even-numbered data line.

According to the embodiment of the present invention, one of the adjacent pixel areas in a row direction is connected to an odd-numbered data line, and the other is connected to an even-numbered data line.

According to the embodiment of the present invention, the LCD further comprising a data driver supplying the data line with a data signal and a controller controlling the data driver, wherein the controller controls the data driver to supply the same polarity of data signals to the data lines disposed between the pixel areas.

According to the embodiment of the present invention, the LCD further comprising a data driver supplying the data line with a data signal and a controller controlling the data driver, wherein the controller controls the data driver to supply the different polarity of data signals to the data lines disposed between the pixel areas.

According to the embodiment of the present invention, the LCD further comprising an backlight unit providing light of three primary colors to the pixel area sequentially by one frame period.

According to the embodiment of the present invention, a frequency of frame is higher than 180 Hz.

The foregoing and/or other aspects of the present invention are also achieved by providing a driving method for an LCD comprising a TFT substrate on which pixel areas are arranged in a matrix layout formed by a gate line and a data line crossing the gate line and a backlight unit providing the TFT substrate with light of three primary colors. The method comprises providing the TFT substrate with light of the three primary colors sequentially in one frame period and supplying at least two rows of pixel areas with a gate signal simultaneously.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE PREFERRED EMBODIMENT

Figure 1:
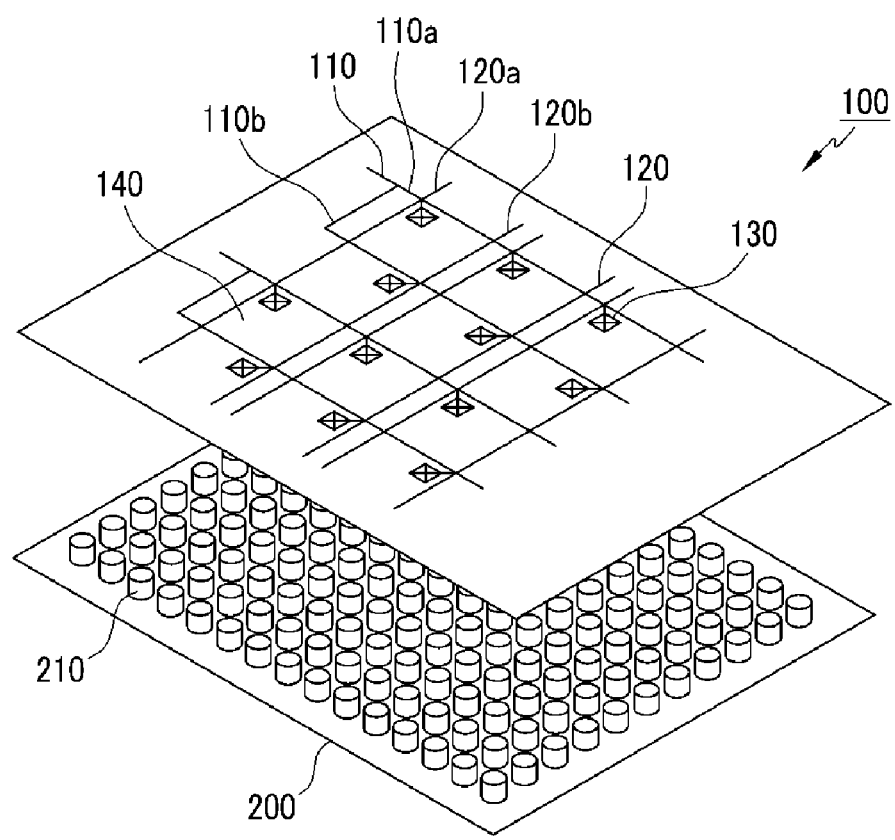
FIG. 1 is a view of an LCD according to a first embodiment of the present invention.

Reference will now be made in detail to exemplary embodiments of the present invention, examples of which are illustrated in the accompanying drawings, wherein like reference numerals refer to like elements throughout.

First Embodiment

Figure 2:
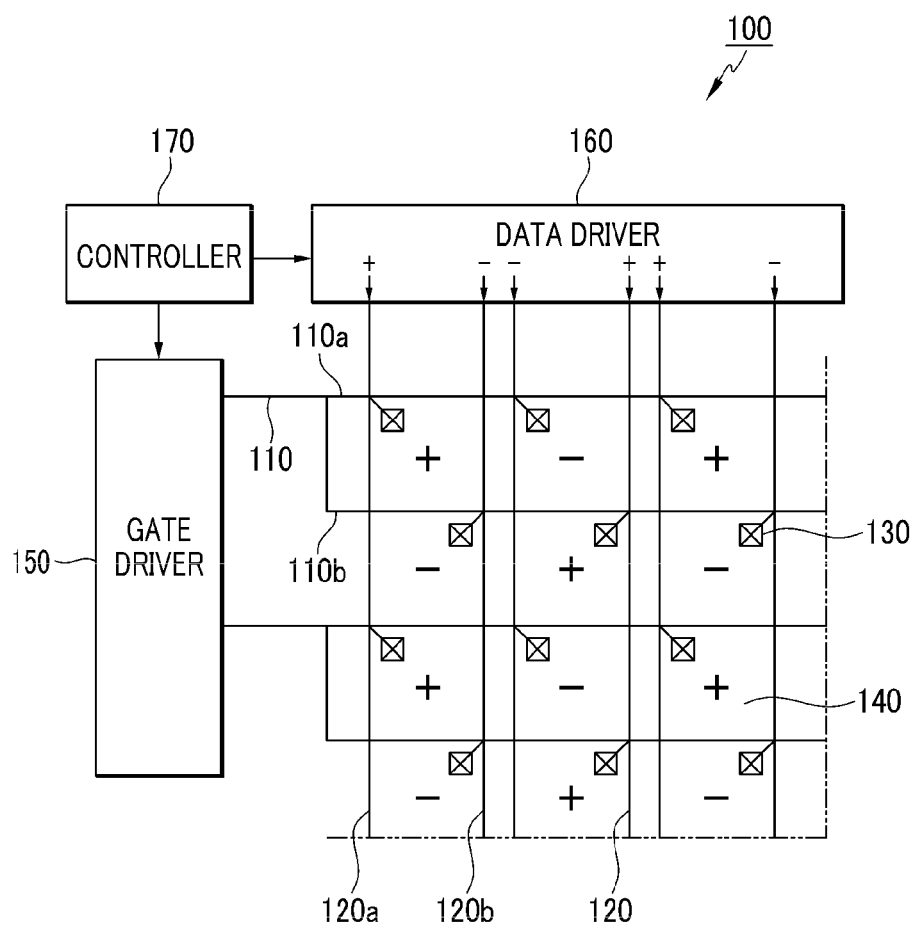
FIG. 2 is an arrangement view of a TFT substrate illustrating a driving method for the LCD according to the first embodiment of the present invention.

The first embodiment of the present invention will be appreciated by reference to FIGS. 1 and 2.

As shown in FIG. 1, an LCD comprises a TFT substrate 100 and an backlight unit 200.

The TFT substrate 100 comprises data lines 120, 120a and 120b; and gate lines 110a and 110b crossing the data lines 120a, 120b and 120 thereby forming a pixel area 140 arranged in a matrix array; and a TFT 130 disposed at an intersection of the gate line 110a and the data line 120.

Here, a pair of the gate lines 110a and 110b are connected with each other at their ends. Therefore, a single gate signal supplied by a gate driver (not shown) is applied to the pair of gate lines 110a and 110b at the same time. With this configuration, two rows of the pixel area 140 are driven for one gate on time.

In a conventional LCD, the gate signal supplied by a gate driver is applied to only one gate line at a time, thereby driving only one row of the pixel area 140. Unlike the conventional driving method, in a field sequential color (hereinafter referred to as 'FSC') driving method, red, green and blue lights are sequentially radiated for forming one frame. In other words, the number of the gate signals applied to the gate line has to be three times as much as a frequency recognized by a user to form one frame in the FSC driving. For example, the actual frequency for the FSC driving has to be higher than 180 Hz so that the user considers the image to be 60 Hz. Accordingly, the gate on time for a display apparatus having a 1280*1024 resolution and an apparent frequency of 60 Hz equals 1/(the apparent frequency*the number of the gate lines*3), i.e. 1/(60*1024*3)=5.425 μs.

However, when a gate signal is applied simultaneously to the pair of gate lines 110 connected with each other, the gate on time becomes 10.850 μs which is twice as long as the conventional gate on time. As the gate on time increases, a time for charging data signals in the pixel area 140 is also prolonged, thereby improving a charging rate in the pixel electrode. Further, since passages connecting the gate drivers and the gate lines are halved, the number of the gate pads and the gate drivers is also halved.

Although two gate lines 110 are connected at their ends in the first embodiment, more than three gate lines may be connected with one another. Since the display apparatus adopting an impulsive driving, producing a black image between the frames, should be driven twice as fast as the conventional display apparatus, the impulsive driving display apparatus can also employ the above configuration of the present invention that applies one gate signal to the multiple gate lines simultaneously.

The data line 120 crosses the gate line 110, thereby forming the pixel area 140 arranged in the matrix array. The data line 120 is arranged in such a way that two data lines 120a and 120b are disposed at opposite sides of one pixel area 140. In other words, the two data lines 120a and 120b are disposed between the adjacent pixel areas 140. Since the same gate signal is applied to two rows of the pixel area 140, the above arrangement for the data lines 120a and 120b is required to apply different data signals to the adjacent pixel areas 140 in a column direction. The TFTs 130 are appropriately arranged at intersections of the two gate lines 110a and 110b and the two data lines 120a and 120b so that the same data signal is not applied to the adjacent pixel areas 140 in a column direction. As shown in FIG. 1, one of the adjacent pixel rows is connected to the odd-numbered data line 120a, and the other is connected to the even-numbered data line 120b.

The number of the data lines 120 disposed between the pixel areas 140 corresponds to the number of rows of the pixel area 140 where the same gate signal is applied, i.e. the number of the gate lines 110 connected with one another at their ends. Therefore, the number of the gate lines 110 connected with one another is proportional to the number of the data lines 120 disposed between the pixel areas 140. As described before, more than three gate lines 110 may be connected with one another. In this case, more than three data lines 120 are disposed between the adjacent pixel areas 140 arrayed in a row direction. Since color filters are not used in the FSC driving, one pixel area 140 is three times larger than that of the conventional LCD. Accordingly, disposing three data lines 120 between the pixel areas 140 does not make a big difference in an aperture ratio.

The TFT 130 delivers the gate signal supplied from the gate line 110 and the data signal supplied from the data line 120 to the pixel area 140. As shown in FIG. 1, the adjacent TFTs 130 arrayed in a column direction are connected to different data lines 120a and 120b, thereby being arranged in a zigzag form. Such arrangement of the TFTs 130 allows the adjacent pixel areas 140 arrayed in a column direction to be connected to different data lines 120a and 120b, respectively. Accordingly, the adjacent pixel areas 140 arrayed in a column direction are supplied with a different data signal.

The backlight unit 200 comprises a plurality of LEDs 210 (light emitting diode) and a supporter (not shown) supporting the LED 210, a diffusing plate (not shown) diffusing the light from the LED 210 and a LED substrate. Each LED 210, is a point light source, emits red, green and blue lights.

The backlight unit 200 may be a direct type providing light from below the TFT substrate 100 or an edge type providing light from a side of the TFT substrate 100.

A driving method for an LCD according to the first embodiment of the present invention will be described with reference to FIG. 2. As shown in FIG. 2, the TFT substrate 100 comprises not only the gate line 110 and the data line 120 but also a gate driver 150, a data driver 160 and a controller 170.

The gate driver 150 supplies the gate line 110 with a number of control signals driving the gate line 110. The gate driver 150, synchronized with a starting signal (STV) and a gate clock (CPV) from the controller 170, supplies each gate line 110 with the gate on voltage.

The data driver 160 converts an image data signal, synchronizing with clock (HCLK), into a corresponding gray scale voltage, and then delivers appropriate data signals to each data line 120 according to a load signal from the controller 170.

The LCD adopts an inversion driving method inverting a polarity of the data signal supplied to the pixel area 140 by frame. Generally, a frame inversion or a line inversion causes a flicker, therefore a dot inversion is widely adopted. While the frame inversion inverts the polarity of the data signal by frame, the line inversion inverts by gate line. In the dot inversion, the adjacent pixels have different polarities.

As shown in FIG. 2, the data driver 160 inverts the polarity of the data signal by data line 120. The two data lines 120*a* and 120*b* disposed between the adjacent pixel areas 140 arrayed in a row direction are supplied with the data signals having the same polarity. Meanwhile, the adjacent pixel areas 140 arrayed in a column direction are connected to different data lines 120, therefore, they are supplied with the data signals having different polarities. Though the data driver 160 supplies the data signals having different polarities by line, the result is the same as in the dot inversion. With this configuration, the flicker can be cleared.

The controller 170 produces a number of the control signals driving the gate line 110 and the data line 120, and controls the data driver 160 to supply the data signals having different polarities by data line 120. The dot inversion depends on how the pixel area 140 and the data line 120 are connected and what polarity of the data signal is applied to the data line 120, therefore the dot inversion can be embodied by various combinations of them. After a wiring pattern of the TFT substrate 100 is completed by connecting the pixel area 140 and the data line 120, the controller 150 controls the data driver 140 to produce the data signals having different polarities, thereby carrying out the dot inversion.

Second Embodiment

Figure 3:
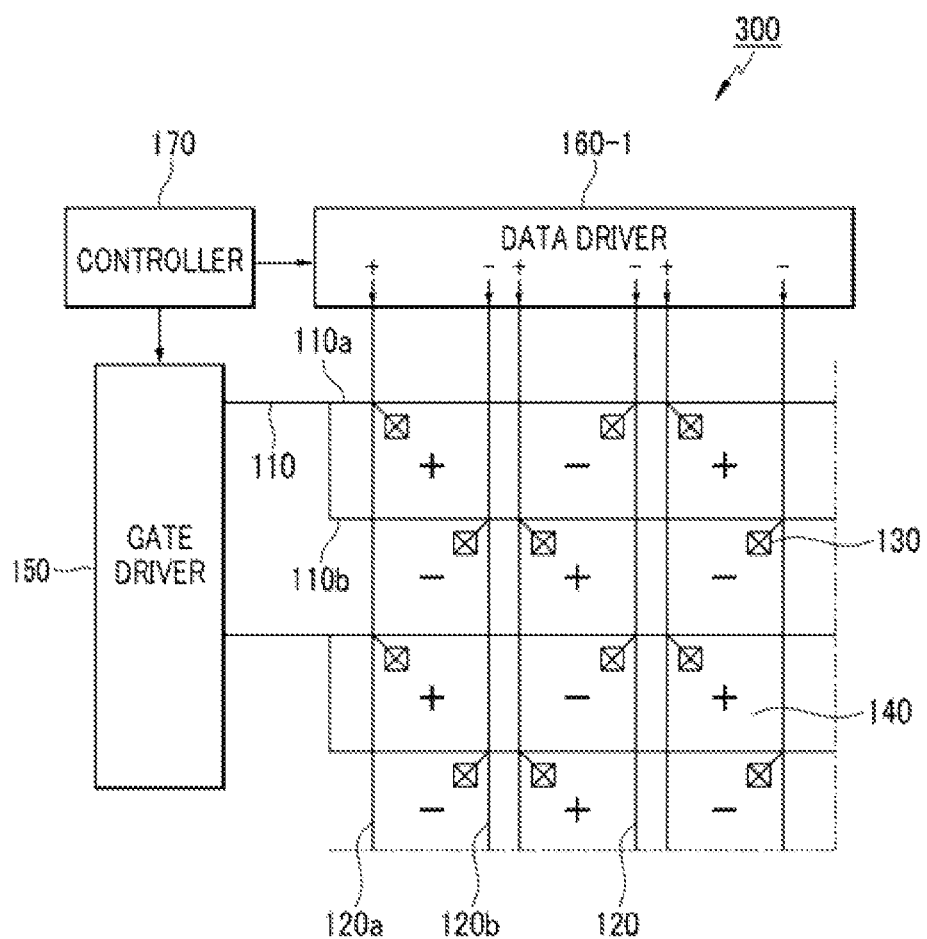
FIG. 3 is an arrangement view of a TFT substrate illustrating a driving method for an LCD according to a second embodiment of the present invention.

A second embodiment of a driving method of an LCD according to the present invention will be appreciated in by referring to FIG. 3 in connection with the following explanation.

The elements of the second embodiment that are identical to the elements of the first embodiment have the same reference numerals as the elements of the first embodiment. Moreover, the descriptions of the elements of the second embodiment that are identical to the elements of the first embodiment have been omitted for the sake of brevity. Data drive 160-1 differs from data drive 160 only in the order of the polarity of the output signals on the data lines.

As shown in FIG. 3, pixel areas 140 in a column direction are connected alternatively to the pair of data lines for data lines associated with the column of pixel areas. Adjacent columns of pixel areas 140 are symmetric with respect to the data line disposed therebetween. One of the adjacent pixel areas 140 in a row direction is connected to an odd-numbered data line (120*a*), and the other is connected to an even-numbered data line (120*b*).

For performing the dot inversion, a positive polarity (+) of data signal is applied to the odd-numbered data line 120*a*, and a negative polarity (−) of data signal is applied to the even-numbered data line 120*b*. Or stated differently, that means opposite polarity data signals are applied to adjacent data lines alternatively. Like the above, the dot inversion can be performed by adjusting an arrangement of the pixel areas 140 and the polarity of the data signal.

Third Embodiment

Figure 4:
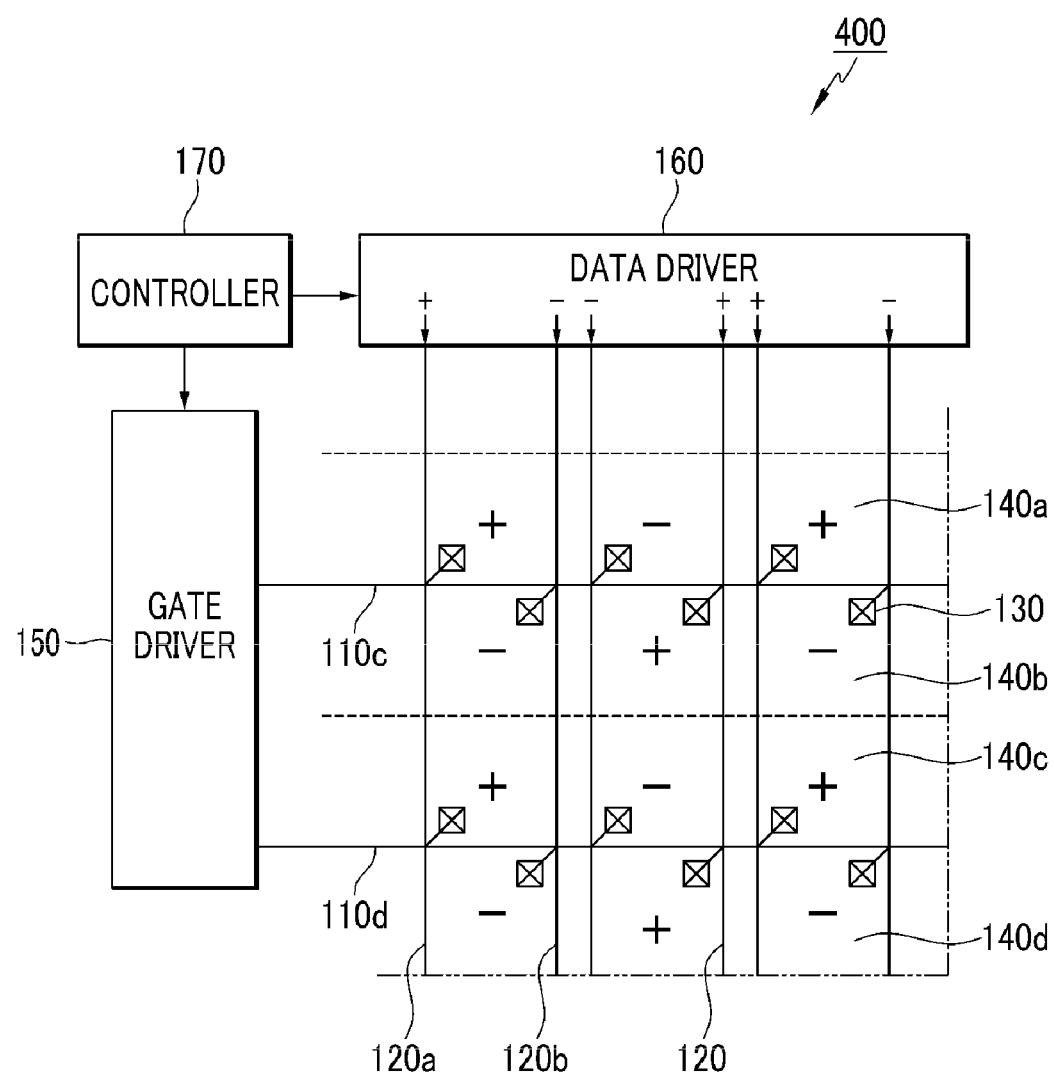
FIG. 4 is an arrangement view of a TFT substrate illustrating a driving method for an LCD according to a third embodiment of the present invention.

Referring to FIG. 4, a driving method for an LCD according to a third embodiment of the present invention will be described. As shown in FIG. 4, gate lines 110*c* and 110*d* drive in common adjacent rows of pixels. For example, gate line 110*c* drives two rows of pixel areas 140*a* and 140*b*. Similarly, gate line 110*d* supplies a common gate signal to two rows of pixel areas 140*c* and 140*d*. Viewed in the column direction, the adjacent pixel areas 140*a* through 140*d* viewed from a data drive standpoint are electrically separated. Thus the adjacent pixel areas 140 in a column direction are supplied with different polarity data signals. Since gate line 110*c* drives the two rows of pixel area 140*a* and 140*b*, every TFT 130 belonging to the two rows of pixel areas 140*a* and 140*b* is connected to gate line 110*c*, and is connected to different rows of pixel areas 140 alternatively along the row direction. Controller 170 controls a data driver 160 so that adjacent pixel areas 140 viewed in the column direction are provided with different polarity of the data signals. Accordingly, like the layout in FIG. 2, the data driver 160 supplies different polarity data signals to the two adjacent data line 120*a* and 120*b* in a row direction disposed between the adjacent pixel areas 140.

In case that the TFTs 130 of FIG. 4 are arranged in the same way as in FIG. 3, the data signals having different polarity are applied alternatively to the data lines 120 and at the same time the polarity of the data signal is inverted by gate line 110 for the dot inversion.

Although only a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
   a first gate line and a second gate line disposed on a substrate, wherein the first gate line and the second gate line extend in a the first direction and are arranged in a second direction;
   a first data line, a second data line, a third data line and a fourth data line crossing the first gate line and second gate line, wherein the first data line, the second data line, the third data line and the fourth data line extend in the second direction and are disposed in sequence and arranged in the first direction;
   at least four pixels comprising a first pixel, a second pixel, a third pixel and a fourth pixel; and
   wherein the second data line and the third data line are disposed between the first pixel and the second pixel;
   wherein the second data line and the third data line are disposed between the third pixel and the fourth pixel;
   wherein the second gate line is disposed between the first pixel and the third pixel;
   wherein the first pixel is electrically connected to the first gate line and the second data line;
   wherein the second pixel is electrically connected to the first gate line and the third data line;
   wherein the third pixel is electrically connected to the second gate line and the first data line; and
   wherein the fourth pixel is electrically connected to the second gate line and the fourth data line.

2. The display device of claim 1, wherein the first pixel, the second pixel, the third pixel, and the fourth pixel are disposed in 2×2 matrix.

3. The display device of claim 2, wherein the first pixel is adjacent the second pixel in the first direction and the third pixel in the second direction, and the first pixel is adjacent the fourth pixel in a diagonal direction.

4. The display device of claim 3, wherein the first pixel and the second pixel are disposed between the first gate line and the second gate line.

5. The display device of claim 4, wherein a polarity of the first pixel is the same as a polarity of the fourth pixel and is opposite to a polarity of the second pixel and the third pixel.

6. A display device comprising:
- a first gate line and a second gate line disposed on a substrate, wherein the first gate line and the second gate line extend in a the first direction and are arranged in a second direction;
- a first data line, a second data line, a third data line and a fourth data line crossing the first gate line and second gate line, wherein the first data line, the second data line, the third data line and the fourth data line extend in the second direction and are disposed in sequence and arranged in the first direction;
- at least four pixels comprising a first pixel, a second pixel, a third pixel and a fourth pixel; and
- wherein the second data line and the third data line are disposed between the first pixel and the second pixel;
- wherein the second data line and the third data line are disposed between the third pixel and the fourth pixel;
- wherein the first pixel is electrically connected to the first gate line and the first data line;
- wherein the second pixel is electrically connected to the first gate line and the third data line;
- wherein the third pixel is electrically connected to the second gate line and the second data line;
- wherein the fourth pixel is electrically connected to the second gate line and the fourth data line; and
- wherein the polarity of the first pixel is the same as a polarity of the fourth pixel and is opposite to a polarity of the second pixel and the third pixel.

7. The display device of claim 6, wherein the first pixel, the second pixel, the third pixel, and the fourth pixel are disposed in 2×2 matrix.

8. The display device of claim 7, wherein the first pixel is adjacent the second pixel in the first direction and the third pixel in the second direction, and the first pixel is adjacent the fourth pixel in a diagonal direction.

9. The display device of claim 8, wherein the first pixel and the second pixel are disposed between the first gate line and the second gate line.

* * * * *